Figure 1:
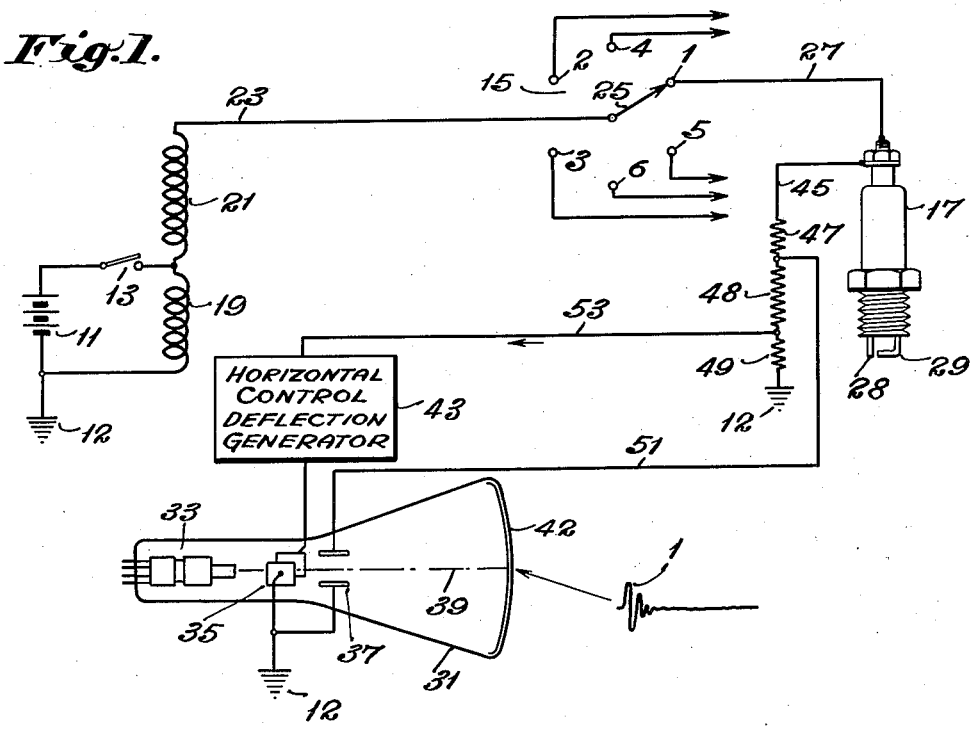

Jan. 2, 1945.

W. VAN B. ROBERTS 2,366,355

INDICATING DEVICE

Filed Dec. 22, 1942

INVENTOR
Walter Van B. Roberts
BY
H. S. Grover,
ATTORNEY

Patented Jan. 2, 1945

2,366,355

UNITED STATES PATENT OFFICE 2,366,355

INDICATING DEVICE

Walter van B. Roberts, Princeton, N. J., assignor to Radio Corporation of America, a corporation of Delaware Application December 22, 1942, Serial No. 469,822

3 Claims. (Cl. 175—183)

This invention is related to electrical apparatus, and particularly to devices used for measurement and observation of certain phenomena. In its specific embodiment, the invention is used jointly with a cathode ray oscillograph which, in turn, is used for indicating visually transients or other forms of response. Where desired, photographic records of the phenomena may be made by photographing the oscillograph pattern in known manner.

Particularly, the apparatus herein to be described is concerned with providing a visible means for determining and indicating the performance of spark plugs in gasoline engines of all types.

In the past, only relatively crude apparatus for such purposes has been used, and with such apparatus as is known in the prior art, great difficulties and delays have been encountered in making it possible promptly to determine which, if any, of the spark plug devices are in good operating order without the need of individually testing each particular element.

The present invention is concerned particularly with the development of a device which provides a relatively cheap and portable means which is well adapted to be used for servicing aircraft engines and, in fact, all forms of automotive gasoline engines. Accordingly, the apparatus is particularly useful at airports, garages and manufacturing plants for the purpose of indicating the exact performance of the sparking system, and making it a relatively simple matter not only to detect and determine imperfect performance, but actually to observe the exact functioning of the particular spark plugs so that any such plugs not functioning correctly may be removed and replaced. In this way it is possible promptly to note and observe the exact seat and cause of imperfect engine operation.

The many advantages of the system herein disclosed will be apparent from the consideration of the specification and claims, but it should be noted that included among the objects of the invention are those of overcoming one or more of the defects in known prior art arrangements, and at the same time to provide a measurement and observation device which is substantially free from all operational defects, and which at the same time will provide visible or recordable indications to show the instantaneous functioning of all of the spark plug devices of the engine, or of individual spark plug devices.

Other objects are those of providing a system for observing performance of such devices which is readily synchronized in such a manner that the resultant traces or observable indications are held substantially stationary in position from time to time, and wherein the apparatus is self-synchronizing under the control of the energy distribution causing each of the spark plugs to fire.

Figure 2:
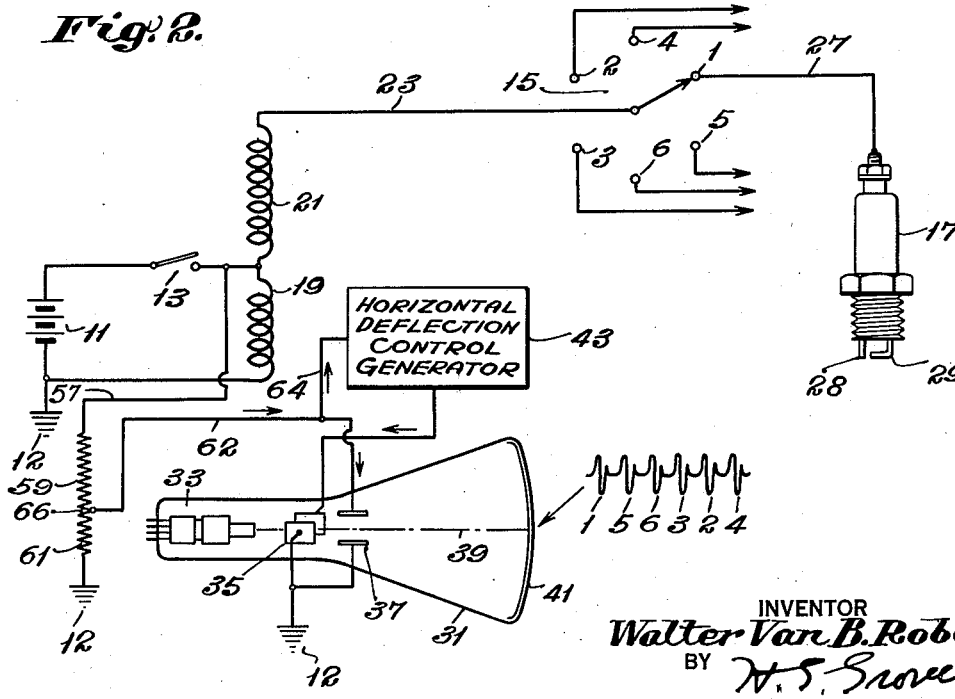

Other objects and advantages of the invention will become apparent and immediately suggest themselves to those skilled in the art when the following specification is read in connection with the accompanying drawing, wherein Fig. 1 illustrates one form of the apparatus wherein the instrumentality is connected to the ignition system, and the spark plugs in such a manner as to indicate the performance of a single spark plug thereof; and Fig. 2 illustrates in schematic manner a cathode ray oscillograph observation device connected in the ignition system in such a manner that the performance of all of the spark plugs of the system are simultaneously observable as a viewing trace upon the luminescent end wall target of the oscillograph tube.

Referring now particularly to the drawing, and first to Fig. 1 thereof, it will be seen that there has been schematically illustrated a conventional ignition system, which may comprise the energy source, such as the battery 11 having one terminal thereof grounded at 12, and the conventionally represented breaker points, shown for illustrative purposes as the switch 13, the transformer comprising the primary winding 19 and the secondary winding 21, of which one terminal of the primary is also grounded at 12, and of which the outer terminal of the secondary 21 connects by way of the conductor 23 to the rotating armature 25 of a distributor 15. Various contacts, shown by the numerals 1 through 6, inclusive, of the distributor 15 are intended to connect to different cylinders of the complete motor, with the numerals adjacent each terminal point being indicated in a conventional manner relative to the rotation of the distributor arm 25. The illustration is intended to show one suitable form of firing order, which it may be assumed follows the designations 1, 5, 6, 3, 2 and 4, although it is to be understood that this is merely given for the purpose of illustration, as is likewise the illustration of the assumed six cylinders, for it is obvious that in automotive engines, the number may vary within wide limits, and particularly for aircraft engines the numbers of cylinders and resultant distributor points are very substantially increased.

In the illustration of Fig. 1 there has been shown only a single spark plug element 17 to which energy is supplied by way of the conductor 27 connecting to the upper terminal thereof in known manner. It will be appreciated, however, that other spark plugs (not shown) connect to each of the other points 5, 6, 3, 2 and 4 in substantially like manner. The energy supplied by way of the breaker points, the transformer and the distributor to the spark plugs is discharged across the gap provided between the points 28 and 29, which are also shown in purely conventional manner.

In order that the spark discharge may be measured and observed, a connection to the spark plug 17 is provided by way of the conductor 45, which will serve to control the deflection of the cathode ray beam 39 within a cathode ray oscilloscope 31 in a manner later to be explained. The oscilloscope tube 31 comprises the usual electron gun 33, represented in purely schematic form, which is adapted when suitably energized by appropriate operating voltages from sources not shown, to produce an electron beam 39 which is directed longitudinally of the tube to strike against a luminescent end wall target or screen, conventionally represented at 41, where it produces a luminous trace due to impact.

In the path of the beam 39 as it moves from the electron gun 33 to the target or screen 41, suitable deflecting means are provided. These deflecting means may be either electrostatic or electromagnetic, or a combination of these two forms, but for illustrative purposes, the drawing shows the horizontal deflection as provided by electrostatic means consisting of two deflecting plate electrode members 35, and the vertical deflection likewise is assumed to be controlled by the electrostatic deflecting plate pair 37. For the purpose of providing horizontal deflection of the electron beam 39 within the tube 31, a horizontal deflection control generator 43 has been provided. This generator preferably consists merely of the usual form of relaxation oscillation generator in which a charge is built up across a condenser element charged through an appropriate form of constant current charging instrumentality, which is dischargeable at times when an associated discharge tube is suitably energized or triggered under the control of a phenomenon which is to be measured.

The discharge tube may be either of the high vacuum or the gaseous type, which is well known in the art. When the deflecting plate electrode pair 35 is connected so that one electrode element is connected to be energized in accordance with the charge upon the storage condenser of the horizontal deflection control generator 43, and the other plate is connected to ground at 12, for instance, the potential across the condenser of the relaxation oscillator combination will be a measure of the deflection. If now a deflection of the beam 39 in the tube 31 can be initiated by suitably energizing or triggering the element 43 under the influence of the transient to be observed, it is apparent that synchronism may be established between deflection of the cathode ray and discharge of the spark plugs.

To this end, a high impedance voltage divider comprising the resistance elements 47, 48 and 49 connects between the conductor 45 attached to the spark plug energizing source and to ground at 12. The voltage divider is chosen in such a way that the values of the resistance elements are such as to provide adequate voltage in the conductor 51 connected intermediate the resistors 47 and 48 to deflect the cathode ray beam 39 in a vertical direction by reason of this voltage being applied between the upper plate of the deflecting plate pair 37, which is attached to the conductor 51, and the lower plate which is grounded at 12. When so applied, this voltage will cause a reasonably substantial deflection of the cathode ray beam 39 at the instant before the spark plug gap between the points 28 and 29 actually breaks down. At the same time, due to the connection of the conductor 53 to a point intermediate the resistors 48 and 49 of the voltage divider, energy to synchronize the horizontal deflection control generator 43 is provided, and under such circumstances it is apparent that the control is so functioning that an initial lateral or horizontal sweep of the cathode ray beam 39 across the target 41 is initiated each time a voltage is applied to deflect the beam vertically or transverse to its lateral movement. It is apparent, therefore, that the natural frequency of the relaxation oscillator contained within the unit 33 is substantially that which corresponds to the frequency at which the distributor arm 25 is rotated.

For instance, each time the breaker points 13 (represented by the conventional switch) operate to cause 600 sparks per second, then it is apparent that the plug 17 will be flashed 100 times a second, assuming a six cylinder engine hereinabove illustrated. Consequently, the normal frequency of the relaxation oscillator 43, which provides the horizontal deflection control energy, should be set so that it is just slightly slower than the 100 cycles per second at which the plug 17 breaks down. In this way the relaxation oscillator is readily subject to the control of the energy derived in the conductor 53 from the voltage divider.

In what has so far been said about synchronizing the frequency of the horizontal sweep circuit of the oscilloscope with the frequency of sparking of a given plug, it has been assumed that the oscilloscope is furnished only with the conventional sweep voltage generator and the conventional connections for causing the sweep frequency to lock in step with the frequency of the voltage being observed, or with a frequency integrally related thereto. In such a conventional system however, it is necessary to adjust the sweep frequency manually to a value fairly close to the desired frequency in order that synchronization may take place. To avoid this manual adjustment, which must be changed whenever the engine speed changes considerably, it is preferred to make use of an oscilloscope equipped with what is known as a "single sweep" circuit, a refinement available on some present commercial oscilloscopes. With this arrangement, no horizontal sweep voltage is generated in the absence of input or signal voltage above a threshold value. For each voltage pulse applied at the synchronizing input terminal over line 53 however, a single horizontal sweep occurs in an adjustable time. Thus the sweep frequency is the same as the spark frequency for all engine speeds.

In installing the apparatus hereinabove described, it is apparent that the total impedance of the voltage divider comprising the resistances 47, 48 and 49 and the nature of the impedance elements themselves should be so chosen as to produce but a minimum effect on the action of the spark produced between the points 28 and 29.

In the arrangement as above described, it is apparent that the lateral or horizontal sweep path is initiated each time the plug 17 is fired, and a vertical deflection which is a measure of the operating conditions of that particular plug will be simultaneously initiated.

Under such circumstances, if the plug 17 is sufficiently dirty, for instance, to prevent a proper spark from occurring between the points 28 and 29, the voltage which will be effective to deflect the cathode ray beam 39 in a vertical direction will be insufficient to cause the deflection to reach a proper peak value.

If the primary circuit of the ignition circuit is too weak to cause a spark at all, the voltage observed will be of a different shape from that which is seen in the case of a dirty or cracked plug.

If the spark gap between the points 28 and 29 is too wide, the voltage peak observed in the vertical direction of deflection across the luminescent target or screen 41 will be too high.

Thus, in general, an experienced observer will be able to know at a glance the exact nature of the trouble, if any, in the operation of the plug 17 to which the oscilloscope is connected.

After having observed the operation conditions of the plug 17, the connection of the conductor 45 may then be removed to another plug, until all of the spark plugs of the system have been completely tested.

By Fig. 2, a modification of the arrangement of Fig. 1 has been shown, with like parts having been designated by like numerals. In the arrangement of the modification, provision has been made whereby the action of all of the spark plugs may be simultaneously observed. In this way, substantial saving of time is provided and, furthermore, the performance of one plug of the system may be accurately compared with the performance of each and every other plug in the system.

To provide this effect, the vertical deflection of the cathode ray beam 39 across the luminescent target or screen 41 is provided from the primary circuit of the transformer 19, 21, by virtue of the connection thereto made by way of the conductor 57, which connects through the voltage divider consisting of the resistors 59 and 61, of which the latter is connected to ground. The voltage across the primary coil 19 appears each time a spark occurs in any of the plugs of the tube system, and by virtue of the connection of the conductor 26 to the junction point 66 of the resistors 59 and 61 on the one hand, and to the vertical deflection plate pair 37 on the other hand, it is apparent that a vertical deflection of the cathode ray beam 39 will be provided on the luminescent target or screen 41.

In order that the complete system may be properly synchronized and locked in step with the operation of the system, the horizontal deflection control generator 43 is now synchronized by way of a voltage derived from that appearing at the junction point 66 of the resistors 59 and 61 of the voltage divider, which voltage is fed to the horizontal deflection control generator by way of the conductors 62 and 64. In this way, the resultant horizontal trace will be initiated upon the firing of one plug of the system, the horizontal sweep frequency being locked in step with the $n$th submultiple of the breaker point frequency, where $n$ is the number of cylinders.

Under such circumstances, and in order to determine which of the vertical deflection pulses induced upon the screen or target 41 of the tube represents any one particular plug, the net result may be obtained easily by shorting one plug of the system at any instant, and it will be seen that a definite peak portion in the vertical deflection has thus been ascertained, and with the firing order of the various cylinders having been known, the sequence of the pattern is readily ascertained.

When the single sweep type of oscilloscope is employed with the system of Fig. 2, it is preferable to take the initiating voltage for the horizontal sweep from a divider circuit connected to one particular plug, as was the case in Fig. 1. In this case, the vertical deflection at the extreme left end of the trace on the screen corresponds to the spark at the aforesaid plug, while successive deflections correspond to the other plugs in the same order as the known firing order of the engine. With the single trace type of operation it is not necessary to adjust the horizontal sweep duration very accurately to watch the spark period, but the sweep duration must be made approximately as long as the period of an individual plug's spark in order that sparks from all the plugs be observable during a single sweep.

By the diagrammatic representations made in the circles adjacent the ends of the tube 31 in each of Figs. 1 and 2, a schematic representation of the wave trace has been represented. It will be seen from the pattern adjacent the end wall of the tube of Fig. 1 that the wave trace indicated by the numeral 1 tends to oscillate to a very slight extent prior to reaching its maximum amplitude, and such effect is believed to be due to oscillatory charging of the plug capacity prior to actual breakdown, and after breakdown occurs, the energy appears as a damped oscillation.

In the diagram attached opposite the luminescent screen or target 41 of Fig. 2, it will be seen that with the arrangement providing for simultaneously observing the deflection pattern corresponding to all of the spark plugs of the system there will, for a six cylinder engine, be simultaneously observable six distinct vertical deflections at each single horizontal deflection. Such vertical deflections have been very schematically illustrated in the order in which they appear (that is, the assumed order of firing) by the numerals which correspond to the different terminals indicated for the distributor 15.

Where it is desired to vary the frequency of the horizontal deflection, it is apparent that the natural deflection frequency of the horizontal deflection control generator 43 may be varied in any well known manner as, for instance, by varying the capacity which is charged to be discharged by the discharge tube, by varying the charging resistance, or by varying the current which is flowing into the condenser to produce the deflection. Various ways and means for providing such charging deflecting rays are well known in the art, as are the relaxation oscillators, and accordingly the showing of the horizontal deflection control generator and the manner of controlling it is made in purely schematic style.

It is, of course, apparent that various modifications of the invention may be made without departing either from its spirit or scope, and I, therefore, believe myself entitled to make and use any and all such modifications, provided they fall fairly within the spirit and scope of the following claims.

Having described my invention, what I claim as new and desire to have protected by Letters Patent is:

1. In combination, an internal combustion engine including an ignition system and spark plugs, a cathode ray oscilloscope having included therein means to develop an electron scanning beam and means associated therewith for deflecting the developed beam in a plurality of mutually perpendicular directions, adjustable oscillator means for controlling the deflection of the cathode ray beam in one of its directions of sweep, means for synchronizing the oscillator at a frequency having an integral relation to the frequency at which spark discharge is produced in said spark plugs, a high impedance voltage divider for deriving from said ignition system a voltage representative of the state of operation of the spark plugs, and means for energizing and controlling the deflection of the cathode ray beam in the second direction of deflection under the control of said derived voltage.

2. In combination, an internal combustion engine including an ignition system comprising a primary and secondary transformer winding, a contact making and breaking element, a distributor, and spark plugs of a number corresponding to the number of cylinders in the motor, a cathode ray oscilloscope including means for developing a cathode ray scanning beam and means for deflecting said scanning beam in each of two mutually perpendicular directions relative to an observation target, a source of deflection control energy for normally deflecting said cathode ray beam in one of its directions of deflection at a rate substantially corresponding to the rate at which all of the spark plugs of the system are fired, and means including an impedance element for deriving a voltage from the primary circuit of the ignition system for controlling the deflection of the developed cathode ray beam in the other of said directions and for simultaneously initiating a control of the deflection energy developed for deflecting the said cathode ray beam in its first direction of deflection.

3. In combination, a multi-cylinder internal combustion engine including an ignition system comprising a primary and secondary transformer winding, a contact making and breaking element, a distributor, and spark plugs of a number corresponding to the number of cylinders in the motor, a cathode ray oscilloscope including means for developing a cathode ray scanning beam and a pair of deflecting means for deflecting said scanning beam in each of two mutually perpendicular directions relative to an observation target, a connection from one winding of said transformer to one of said deflecting means for deflecting said cathode ray beam in one of its directions of deflection, a connection from the said ignition system to the other of said deflecting means, said last named connection including means for generating repetitive deflections of the developed cathode ray beam in the other of said directions at a frequency equal to the frequency of operation of the contact making and breaking element divided by the number of engine cylinders.

WALTER van B. ROBERTS.